United States Patent
Ianev et al.

(10) Patent No.: US 11,792,871 B2
(45) Date of Patent: Oct. 17, 2023

(54) CORE NETWORK NODE AND METHOD FOR HANDLING REDUNDANT URLLC CONNECTIONS

(71) Applicant: NEC Corporation, Tokyo (JP)

(72) Inventors: Iskren Ianev, Lower Earley (GB); Toshiyuki Tamura, Tokyo (JP); Linghang Fan, Woking (GB)

(73) Assignee: NEC CORPORATION, Tokyo (JP)

( * ) Notice: Subject to any disclaimer, the term of this patent is extended or adjusted under 35 U.S.C. 154(b) by 164 days.

(21) Appl. No.: 17/414,597

(22) PCT Filed: Dec. 6, 2019

(86) PCT No.: PCT/JP2019/047749
§ 371 (c)(1),
(2) Date: Jun. 16, 2021

(87) PCT Pub. No.: WO2020/144986
PCT Pub. Date: Jul. 16, 2020

(65) Prior Publication Data
US 2022/0141908 A1 May 5, 2022

(30) Foreign Application Priority Data
Jan. 8, 2019 (EP) .................................... 19150842

(51) Int. Cl.
*H04W 76/18* (2018.01)
*H04W 8/18* (2009.01)

(52) U.S. Cl.
CPC .............. *H04W 76/18* (2018.02); *H04W 8/18* (2013.01)

(58) Field of Classification Search
CPC ........ H04W 76/18; H04W 8/18; H04W 76/15
See application file for complete search history.

(56) References Cited

U.S. PATENT DOCUMENTS

| | | |
|---|---|---|
| 2018/0199315 A1 | 7/2018 | Hong et al. |
| 2018/0309660 A1 | 10/2018 | Loehr et al. |
| 2022/0007444 A1 | 1/2022 | Kawasaki et al. |

FOREIGN PATENT DOCUMENTS

| | | | |
|---|---|---|---|
| JP | 2020-88472 A | 6/2020 | |
| WO | WO-2020096396 A1 | * 5/2020 | ........... H04L 5/0053 |

OTHER PUBLICATIONS

JR Office Action for JR Application No. 2021-539393, dated Jun. 28, 2022 with English Translation.
Qualcomm Incorporated, "Analysis of URLLC solutions using DC". 3GPP TSG SA WG2 Meeting #129bis, S2-1811944. pp. 1-18.
International Search Report for PCT Application No. PCT/JP2019/047749, dated Mar. 4, 2020.
English translation of Written opinion for PCT Application No. PCT/JP2019/047749, dated Mar. 4, 2020.

(Continued)

*Primary Examiner* — Marisol Figueroa
(74) *Attorney, Agent, or Firm* — Sughrue Mion, PLLC

(57) ABSTRACT

The current disclosure proposes URLLC support indication exchange between the network nodes and URLLC support by the network indication in the Registration procedure so that a URLLC capable UE knows whether it could initiate URLLC type of PDU session establishment.

6 Claims, 12 Drawing Sheets

(56) References Cited

OTHER PUBLICATIONS

3GPP TS 23.725, "Technical Specification Group services and System Aspects;Study on enhancement of Ultra-Reliable Low-Latency Communication (URLLC) support in the 5G Core network (5GC)(Release 16)", (Dec. 19, 2018), pp. 1-76, V16.0.0.
3GPP TS 22.261, "Technical Specification Group services and System Aspects; Service requirements for the 5G system; Stage 1 (Release 16)", (Dec. 2018), V16.6.0.
3GPP TR 21.905, "Technical Specification Group Services and System Aspects; Vocabulary for 3GPP Specifications (Release 15)", (Mar. 2018), pp. 1-64, V15.0.0.
3GPP TS 23.501, "Technical Specification Group Services and System Aspects; System Architecture for the 5G System; Stage 2 (Release 15)", (Sep. 2018), pp. 1-226, V15.3.0.
3GPP TS 23.502, "Technical Specification Group Services and System Aspects; Procedures for the 5G System; Stage 2 (Release 15)", (Sep. 2016), pp. 1-329, V15.3.0.
3GPP TS 38.413, "Technical Specification Group Radio Access Network; NG-RAN; NG Application Protocol (NGAP)(Release 15)", (Sep. 2018), pp. 1-295, V15.1.0.
3GPP TS 38.331, "Technical Specification Group Radio Access Network; NR; Radio Resource Control (RRC) protocol specification (Release 15)", (Sep. 2018), pp. 1-445, V15.3.0.
3GPP TR 23.725, "Technical Specification Group Services and System Aspects; Study on enhancement of Ultra-Reliable Low-Latency Communication (URLLC) support in the 5G Core network (5GC) (Release 16)", (Dec. 2018), pp. 1-75, V2.0.0.
3GPP, Procedure Update for MA-PDU Session Establishment, SA WG2 Meeting #129bis S2-1811754, Nov. 25-30, 2018, West Palm Beach, Fiorida, pp. 1-6, FS_ATSSS/ Rel-16.
IEEE Computer Society, "IEEE Standard for Local and metropolitan area networks—Frame Replication and Elimination for Reliability (IEEE Std 802.1CB™-2017)", Approved Sep. 28, 2017, pp. 1-99, USA.
IEEE Computer Society, "IEEE Standard for Local and Metropolitan Area Networks—Bridges and Bridged Networks (IEEE Std 802.1Q™-2018)", Approved May 7, 2018, pp. 1-1991, USA.
3GPP TR 23.725, "Technical Specification Group services and System Aspects;Study on enhancement of Ultra-Reliable Low-Latency Communication (URLLC) support in the 5G Core network (5GC)(Release 16)", (Dec. 19, 2018), pp. 1-76, V16.0.0.

\* cited by examiner

UE network capability information element

| 8 | 7 | 6 | 5 | 4 | 3 | 2 | 1 | |
|---|---|---|---|---|---|---|---|---|
| UE network capability IEI | | | | | | | | octet 1 |
| Length of UE network capability contents | | | | | | | | octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5* |
| UCS2 | UIA1 | UIA2 | UIA3 | UIA4 | UIA5 | UIA6 | UIA7 | octet 6* |
| ProSe-dd | ProSe | H.245-ASH | ACC-CSFB | LPP | LCS | 1xSR VCC | NF | octet 7* |
| ePCO | CIoT | ERw/o PDN | S1-U data | UP CIoT CP | CP CIoT | ProSe relay | ProSe dc | octet 8* |
| 15 bearers | SGC | N1mode | DCNR | CP backoff | Restric EC | V2X PC5 | multipl eDRB | octet 9* |
| URLLC | 0 | 0 | 0 | 0 | 0 | 0 | 0 | octet 10*–15* |
| Spare | | | | | | | | |

URLLC (e.g. redundant user path) capability/support indication
0 – URLLC not supported
1 – URLLC supported

Figure 3

CORE NETWORK NODE AND METHOD FOR HANDLING REDUNDANT URLLC CONNECTIONS

This application is a National Stage Entry of PCT/JP2019/047749 filed on Dec. 6, 2020, which claims priority from European Patent Application 19150842.3 filed on Jan. 8, 2019, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to the provision of Ultra Reliable and Low Latency Communication (URLLC) in the so-called '5G' (or 'Next Generation') systems.

BACKGROUND ART

The 3GPP SA2 Working Group is working on URLLC (Ultra Reliable Low Latency Communication) Study Item. The objective is to study and perform an evaluation of potential architecture enhancements for supporting URLLC services in the 5G System. Specifically, the following aspects are covered:

Investigate the key issues for meeting the URLLC requirements on latency, jitter and reliability in 5G System as defined in TS 22.261

Study how to minimize the impacts of the UE mobility to the latency and jitter between the Access Network (AN) and the Core Network (CN), and within the CN.

Study how to realize transmission with reliability higher than the reliabilities of a single user plane tunnel of N3 and N9 and NFs in the user plane path.

Study how to monitor the QoS of the QoS flow with URLLC requirement.

Study potential impacts to charging and policy control

The SA2 have defined a solution (TR 23.725, 6.1) which enables a terminal device to set up two redundant PDU sessions over the 5G network (see FIG. 1) so that the network will attempt to make the paths of the two redundant PDU sessions independent whenever that is possible. The 3GPP network provides two paths from the device: the first PDU session spans from the UE via the NG-RAN node1 501 to the UPF1 751 acting as the PDU session Anchor, and the second PDU session spans from the UE via the NG-RAN node2 502 to the UPF2 752 acting as the PDU session Anchor. Based on these two independent PDU sessions, two independent paths are set up. This solution is based on the Dual Connectivity feature that is supported both by LTE and NR. The UE sets up two PDU sessions, one via the MNG-RAN node 501 to the UPF1 751 acting as the PDU session anchor, and another one via the SNG-RAN node 502 to the UPF2 752 acting as the PDU session anchor. The UPF1 751 and the UPF2 752 connect to the same Data Network (DN), even though the traffic via the UPF1 751 and the UPF2 752 might be routed via different user plane nodes within the DN. The UPF1 751 and the UPF2 752 are controlled by the SMF1 731 and the SMF2 732, respectively, where the SMF1 731 and the SMF2 732 may coincide depending on operator configuration of the SMF selection. It is relied on upper layer protocols, such as the IEEE TSN (Time Sensitive Networking) FRER (Frame Replication and Elimination for Reliability), to manage the replication and elimination of redundant packets/frames over the duplicate paths.

SUMMARY OF INVENTION

Technical Problem

The above described URLLC solution TR23.725, 6.1 and other URLLC solutions make assumptions that there will be deployment compatibility between the RAN nodes the Core Network Nodes like:

The core network UPF deployment is aligned with RAN deployment and supports redundant user plane paths.

The underlying transport topology is aligned with the RAN and UPF deployment and supports redundant user plane paths.

The physical network topology and geographical distribution of functions also supports the redundant user plane paths to the extent deemed necessary by the operator.

These assumptions however would be difficult or even impossible to be met by the operators in order to assure that a UE that requests a redundant user path (i.e., URLLC user connection) will always connect to RAN and Core Network nodes that support URLLC (i.e., support user patch redundancy), see FIG. 1.

There is no guarantee that:

[problem 1] A URLLC capable UE will select a URLLC supporting NG-RAN—Currently the UE does not know which NG-RAN is the URLLC supporting NG-RAN.

[problem 2] A URLLC capable NG-RAN will select a URLLC capable AMF—Currently the NG-RAN does not have information about which AMFs in the AMF sets the NG-RAN is connected to, are the URLLC supporting AMF. It is not practical (i.e., not cost effective) that all connected AMFs would be supporting URLLC.

[problem 3] A URLLC capable AMF will select URLLC capable SMF—Currently the AMF does not have information about which SMF is the URLLC supporting SMF. It is not practical (i.e., not cost effective) that all SMFs that an AMF can select are the URLLC supporting SMFs.

Solution to Problem

According to an aspect of the present disclosure, a core network node includes: means for receiving a request for establishment of a Protocol Data Unit, PDU, session; means for determining that redundant handling is not allowed for the PDU session; and means for performing rejecting the establishment of the PDU session with redundancy handling.

According to another aspect of the present disclosure, a method for a core network node, includes: receiving a request for establishment of a Protocol Data Unit, PDU, session; determining that redundant handling is not allowed for the PDU session; performing rejecting the establishment of the PDU session with redundancy handling.

Advantageous Effects of Invention

In certain aspects, the core network node, the method for the core network node may provide a technology for managing redundant handling of the PDU session(s).

BRIEF DESCRIPTION OF DRAWINGS

FIG. 3 illustrates an example of UE network capability information element.

DESCRIPTION OF EMBODIMENTS

Figure 1:
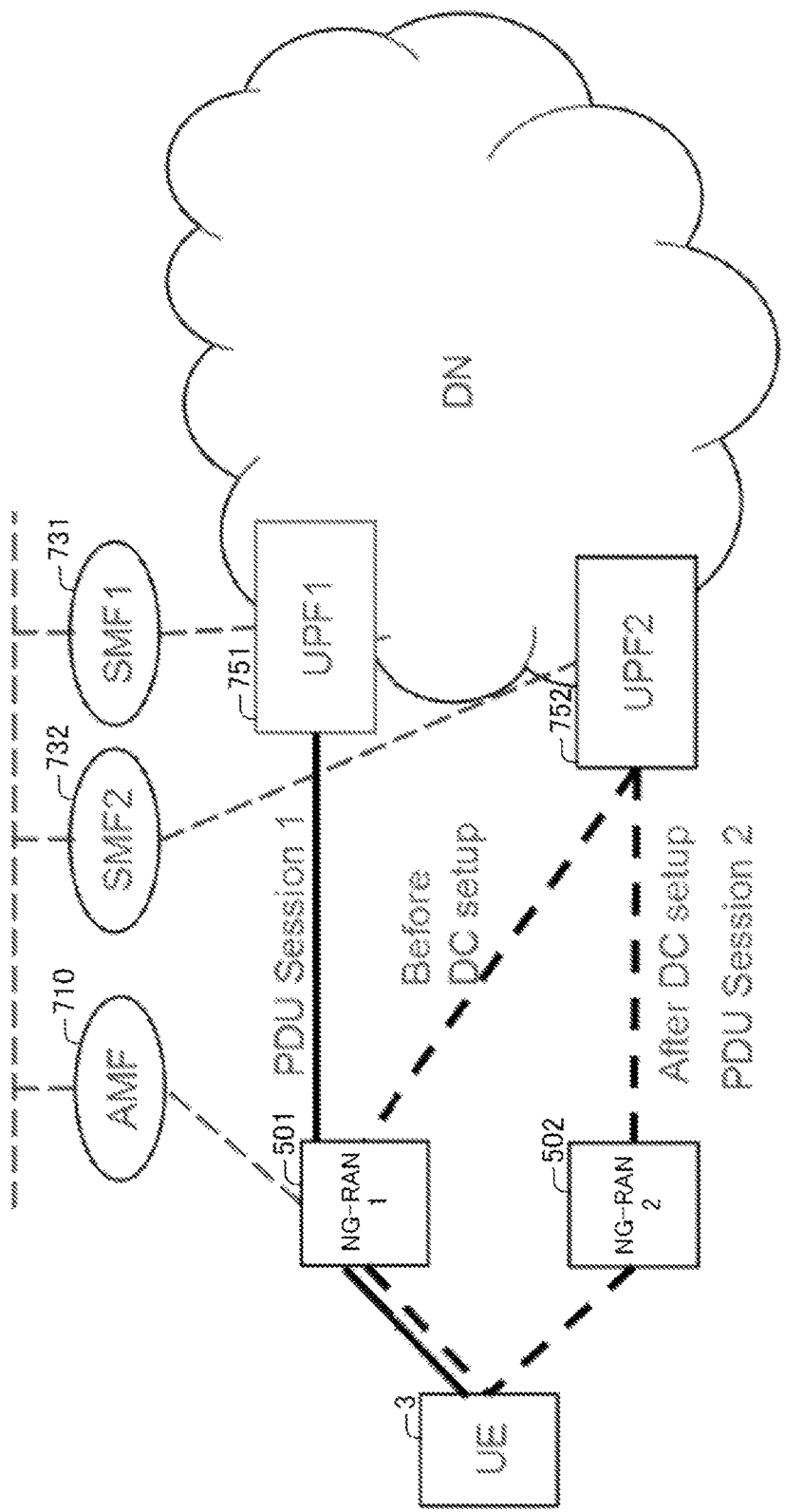
FIG. 1 illustrates an example of URLLC via redundant user plane paths.

In order to avoid URLLC connections establishment (e.g., user redundancy path establishment) failures, the following aspects are provided:
1) The URLLC support indication by the network during the UE Registration so that the UE 3 requests for user path redundancy only when the network supports URLLC. This aspect resolves the problem 1, 2 and 3.
2) The URLLC support negotiation between the AMF 710 and the NG-RAN node 5. This aspect resolves the problem 2.
3) The NG-RAN node 5 broadcasts an URLLC support indication. This aspect addresses the problem 1.
4) The URLLC supporting SMF selection. This aspect resolves the problem 3.
5) The URLLC support via the designated network slice. This aspect resolves the problems 1, 2 and 3 in case the network supports the URLLC homogeneously in the whole registration area.

Aspect 1—URLLC Support Indication by the Network During UE Registration

Figure 2:
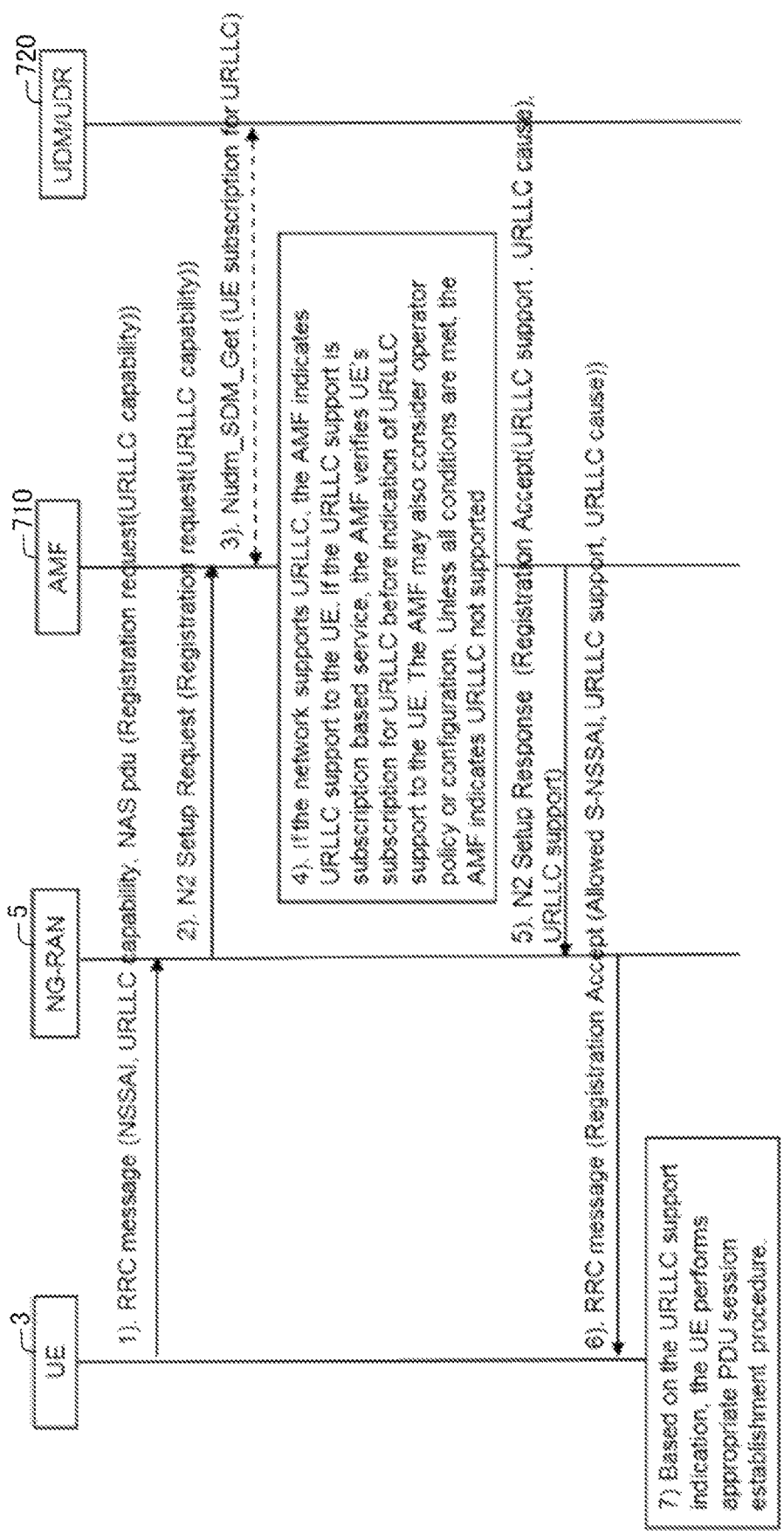
FIG. 2 illustrates an example of the URLLC support indication by the network in the UE Registration procedure.

The Aspect 1 provides for a URLLC support indication by the network during the UE Registration procedure. This allows for the UE 3 to request for URLLC (e.g., PDU Session establishment with user path redundancy) only when the network supports URLLC. An exemplary procedure of the URLLC support indication by the network is illustrated schematically in the FIG. 2.

1) A URLLC capable UE 3 initiates a registration procedure with the network by triggering the Registration Request message. If the UE 3 is capable of URLLC (e.g., user plane redundancy), the UE 3 indicates its capability/support for URLLC by adding a URLLC capability indication parameter (or any other indication for the purpose of indicating the capability of the UE 3 to support the PDU Session establishment with user plane redundancy called for shorter URLLC) in the Registration Request message. The URLLC capability/support parameter can be a designated parameter within the Registration Request message or a part of the UE network capability information element, see FIG. 3.

The Registration Request message is included (e.g., in the form of NAS PDU, container or message) in an RRC message (e.g., RRC Connection Request message or RRC Connection Complete message or any other AS message). The UE 3 may also include its capability/support indication for URLLC support in the RRC message itself as a designated parameter or as a part of the UE Capability Information element. The URLLC capability/support indication in the RRC message will help the NG-RAN node 5 to select an URLLC supporting AMF in case not all connected AMFs support URLLC.

2) The NG-RAN node 5 selects an AMF 710. If the RRC message from the UE 3 includes indication for URLLC support/capability, the NG-RAN node 5 selects an AMF 710 that supports URLLC. The NG-RAN node 5 may select an AMF 710 based on a combination of the indication for URLLC support/capability and an NSSAI (a list of S-NS-SAIs) in the RRC message. The NG-RAN node 5 forwards the Registration Request message from the UE 3 to the selected AMF 710 within the N2 Setup Request message.

3) The AMF 710 may enquire with the UDM/UDR 720 via the Nudm_SDM_Get procedure or any other procedure for retrieving UE subscription information from the UDM/UDR 720, in case URLLC support is the subscription based service. The UE subscription for URLLC is subscriber data information stored in the UDM/UDR 720. This information indicates whether the UE 3 is allowed to establish URLLC including the redundant user plane path establishment. This indication can be per UE basis or per PDU session basis or per Subscribed S-NSSAI basis. The AMF 710 may get a URLLC capability/support indication from the PCF.

4) If the network supports URLLC, the AMF 710 indicates URLLC support to the UE 3. If the URLLC support is subscription based service, the AMF 710 verifies UE's subscription for the URLLC before indication of URLLC support to the UE 3.

The AMF 710 may also consider operator policy or configuration before indicating the support for URLLC. For example, if none of the SMFs connected to the AMF 710 support the URLLC feature, then the AMF 710 shall indicate URLLC not supported to the UE 3.

Unless all conditions are met, the AMF 710 indicates URLLC not supported.

5) The AMF 710 indicates the URLLC support to the UE 3 within the Registration Accept message. The AMF 710 may include a URLLC support parameter in the Registration Accept message. The AMF 710 may include a URLLC support parameter per allowed S-NSSAI basis. The AMF 710 may include a URLLC cause parameter that is associated with the URLLC support parameter. The URLLC support parameter may indicate:
   URLLC support=URLLC supported; or
     URLLC rejected; or
     URLLC not supported; or
     URLLC not subscribed; or
     URLLC not supported in this location; and/or
     URLLC not supported by the vPLMN.

The AMF 710 may also indicate the support for URLLC within the UE Configuration Update message, especially if the support for URLLC changes while the UE 3 is still in the same registration area. The AMF 710 may include a URLLC support parameter per allowed S-NSSAI basis.

The AMF 710 transmits the Registration Accept message to the UE 3 via the NG-RAN node 5 within the N2 Setup Response message. The AMF 710 may also include the URLLC support indication within the N2 Setup Response message itself. This way the AMF 710 configures or updates the NG-RAN node 5 with the AMF capability for URLLC support. The NG-RAN node 5 uses the AMF capability for URLLC support when selecting an AMF for the newly registering UEs with capability for URLLC, e.g., to select the URLLC capable AMF for URLLC capable UEs.

6) The NG-RAN node 5 delivers the UE Registration Accept message to the UE 3 in an RRC message.

7) Based on the URLLC support indication, the UE 3 performs the appropriate PDU session establishment procedure. If the URLLC support indication is included in the Registration Accept message and:
  a) URLLC support indication=URLLC supported—The URLLC is supported by the network and the UE 3 can initiate URLLC connection (e.g., PDU Session establishment with user plane redundancy) when needed.
  b) URLLC support indication=URLLC rejected—this means that the network in general supports URLLC but the use of it is rejected for some reason. In this case the AMF 710 may include a URLLC cause parameter as well in the Registration Accept message to indicate the reason for the URLLC rejection. Examples for the rejection cause could be the following use cases:
  temporary not supported;
  network overloaded.
  c) URLLC support indication=URLLC not supported— The URLLC is not supported by the network in general. The UE 3 shall not trigger the request for URLLC while in this PLMN.
  d) URLLC support indication=URLLC not subscribed— The UE 3 has no subscription for URLLC. The AMF 710 may also include the URLLC cause parameter in order to indicate whether the subscription restriction is per UE in general or per PDU session or per S-NSSAI. The UE 3 shall not trigger the request for URLLC while with this PLMN. If there is a cause clarifying the subscription restriction, the UE 3 shall follow the subscription restrictions e.g., not to initiate URLLC for a specific PDU session or S-NSSAI.
  e) URLLC support indication=URLLC not supported in this location—The network does not support URLLC in this location, e.g., in this cell or TA or Registration Area. The UE 3 shall not initiate the request for URLLC support while the UE 3 is in that location area, e.g., cell or TA or Registration Area.
  f) URLLC support indication=URLLC not supported by the vPLMN—The URLLC is not supported by the visited PLMN. The UE 3 shall not trigger the request for URLLC while in that vPLMN.

Lack of the URLLC support indication can be interpreted by the UE 3 as if URLLC is not supported.

The URLLC support indication that is indicated by the network may be an indication of support one or a combination of ones listed below:
  IEEE 802.1CB (FRER) [8]
  IEEE 802.1Q [9]
  Dual Connectivity The URLLC capability indication parameter that is indicated by the UE 3 may be an indication of support one or a combination of ones listed below:
  IEEE 802.1CB (FRER) [8]
  IEEE 802.1Q [9]
  Dual Connectivity Aspect 2—the URLLC Support Negotiation Between the AMF 710 and the NG-RAN Node 5

The Aspect 2 is about the URLLC capability exchange between the AMF 710 and the NG-RAN node 5. The NG-RAN node 5 needs to know which of the connected AMFs are URLLC capable so that the NG-RAN node 5 can select an URLLC supporting AMF for UEs that are URLLC capable.

Figure 4:
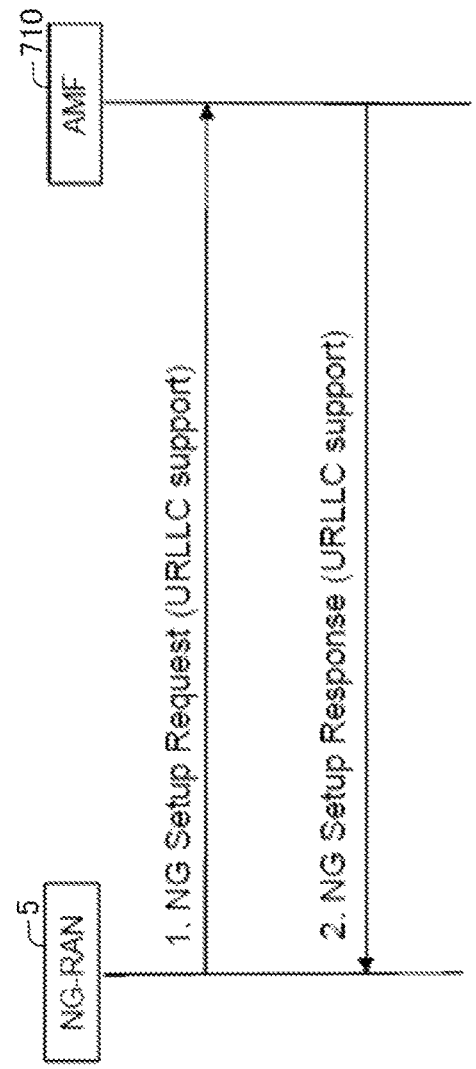
FIG. 4 illustrates schematically a first example of the URLLC support indication exchange between the AMF and the NG-RAN during the NG Connection Setup procedure.

Example 1. FIG. 4 illustrates schematically a first example of the URLLC support indication exchange (i.e., URLLC capability exchange) between the AMF 710 and the NG-RAN node 5 during the NG Connection Setup procedure.

1) When the NG-RAN node 5 initiates connection setup with one of the connected AMFs, the NG-RAN node 5 indicates in the NG Setup Request message its capability for URLLC support.

2) The AMF 710 indicates its capability for URLLC support in the NG Setup Response message by including a URLLC support indication parameter. This way the AMF 710 configures or updates the NG-RAN node 5 with information on its capability for URLLC support. NG-RAN node 5 saves this information (i.e., the URLLC support indication parameter for the AMF 710) and the NG-RAN node 5 uses this information for AMF selection for new UE entrants, i.e., when a URLLC capable UE registers or re-registers with the network, the NG-RAN node 5 will select a URLLC supporting AMF 710. The lack of the URLLC support indication parameter can be interpreted by the NG-RAN node 5 as if the AMF 710 does not support URLLC.

The AMF 710 may also consider the operator policy or the configuration to set the URLLC support indication parameter. For example, if none of the SMFs connected to the AMF 710 support the URLLC feature, then the AMF 710 shall indicate URLLC not supported to the NG-RAN node 5. The AMF 710 may set the URLLC support indication parameter per S-NSSAI basis.

Figure 5:
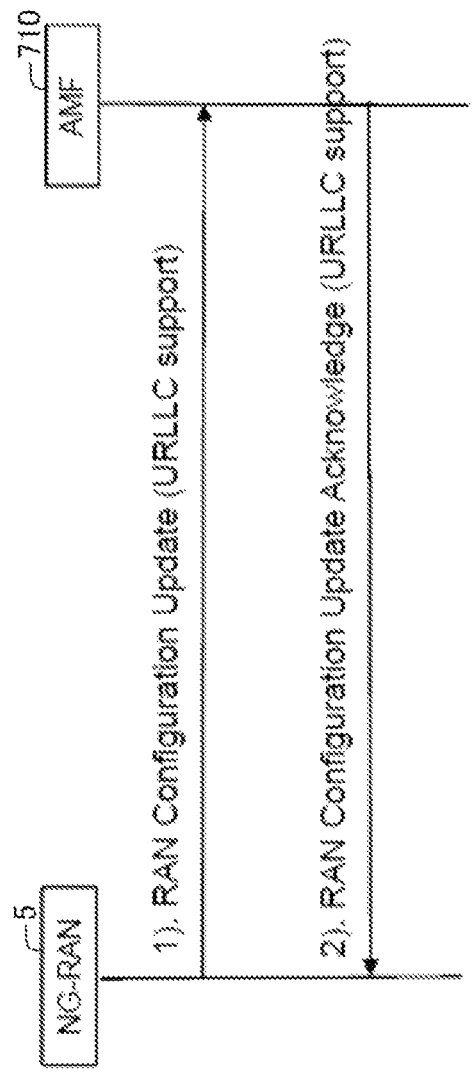
FIG. 5 illustrates schematically a second example of the URLLC support indication exchange between the AMF and the NG-RAN during the RAN Configuration Update procedure.

Example 2. FIG. 5 illustrates schematically a second example of the URLLC support indication exchange (i.e., URLLC capability exchange) between the AMF 710 and the NG-RAN node 5 during the RAN Configuration Update procedure.

1) When the NG-RAN node 5 initiates the RAN Configuration update procedure to an AMF 710, the NG-RAN node 5 indicates in the RAN Configuration Update message its capability for URLLC support.

2) The AMF 710 indicates its capability for URLLC support in the RAN Configuration Update Acknowledge message by including a URLLC support indication parameter. This way the AMF 710 configures or updates the NG-RAN node 5 with information on its capability for URLLC support. The NG-RAN node 5 saves this information (i.e., the URLLC support indication parameter for the AMF 710) and the NG-RAN node 5 uses this information for the AMF selection for new UE entrants, i.e., when a URLLC capable UE registers or re-registers with the network, the NG-RAN node 5 will select a URLLC supporting AMF 710. The lack of the URLLC support indication parameter can be interpreted by the NG-RAN node 5 as the AMF 710 does not support URLLC.

The AMF 710 may also consider operator policy or configuration to set the URLLC support indication parameter. For example, if none of the SMFs connected to the AMF 710 support the URLLC feature, then the AMF 710 shall indicate URLLC not supported to the NG-RAN node 5. The AMF 710 may set the URLLC support indication parameter per S-NSSAI basis.

Figure 6:
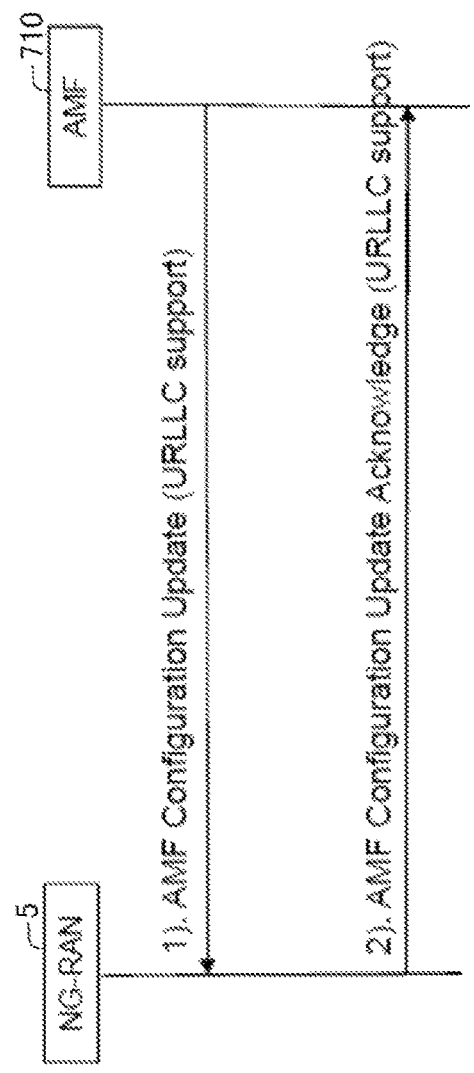
FIG. 6 illustrates schematically a third example of the URLLC support indication exchange between the AMF and the NG-RAN during the AMF Configuration Update procedure.

Example 3. FIG. 6 illustrates schematically a third example of the URLLC support indication exchange (i.e., URLLC capability exchange) between the AMF 710 and the NG-RAN node 5 during the AMF Configuration Update procedure.

1) When the AMF 710 initiates the AMF Configuration update procedure to an NG-RAN node 5, the AMF 710 indicates in the AMF Configuration Update message its capability for URLLC support. This way the AMF 710 configures or updates the NG-RAN node 5 with information about its capability for URLLC support. The NG-RAN node 5 saves this information (i.e., the URLLC support indication parameter for the AMF 710) and the NG-RAN node 5 uses this information for the AMF selection for new UE entrants, i.e., when a URLLC capable UE registers or re-registers with the network, the NG-RAN node 5 will select a URLLC supporting AMF 710. The lack of URLLC support indication can be interpreted by the NG-RAN node 5 as the AMF 710 does not support URLLC.

The AMF 710 may also consider operator policy or configuration to set the URLLC support indication parameter. For example, if none of the SMFs connected to the AMF 710 support the URLLC feature, then the AMF 710 shall indicate URLLC not supported to the NG-RAN node 5. The AMF 710 may set the URLLC support indication parameter per S-NSSAI basis.

2) The NG-RAN node 5 indicates its capability for URLLC support in the AMF Configuration Update Acknowledge message by including a URLLC support indication parameter.

Aspect 3—NG-RAN Node 5 Broadcasts an URLLC Support Indication

Figure 7:
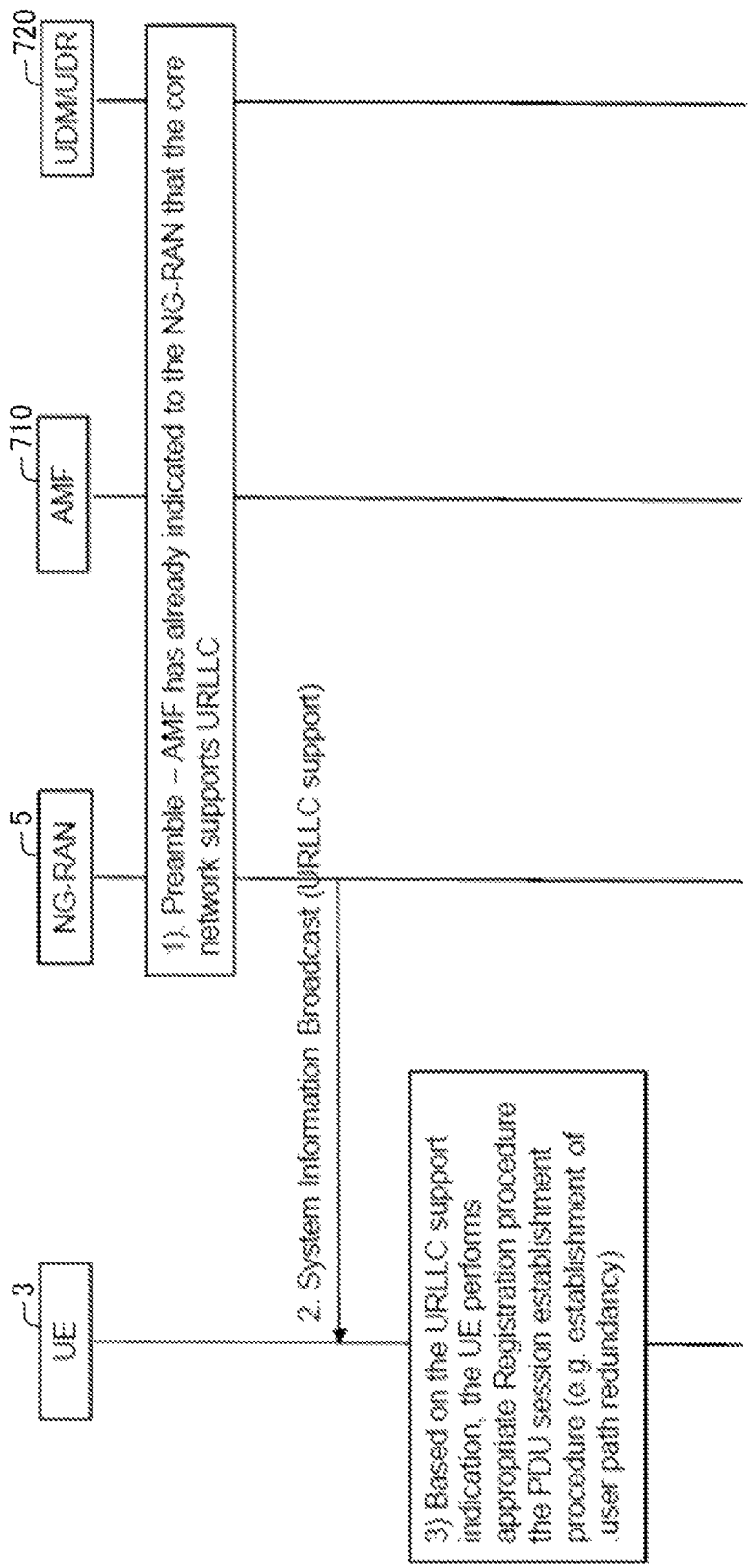
FIG. 7 illustrates an example of the URLLC support indication broadcast in the system information.

The Aspect 3 proposes an URLLC support/capability broadcast by the NG-RAN node 5, i.e., a URLLC supporting indication parameter in one of the System Information messages to be broadcast by the NG-RAN node 5. This is an indication for the UEs that URLLC is supported by the network in that cell. The main steps of the Aspect 3 are illustrated schematically in FIG. 7.

1) Preamble—The AMF 710 has already configured or updated the NG-RAN node 5 with information on whether the Core Network support URLLC. The support for URLLC by the Core Network can change with location, time or based on the overload conditions. Any changes of the URLLC support by the Core Network is updated in the NG-RAN node 5 during the NG Setup procedure or the RAN Configuration Update procedure or the AMF Configuration Update procedure. The AMF 710 may indicate a URLLC support per S-NSSAI basis.

2) If the AMF 710 has indicated the core network's support for URLLC and the NG-RAN node 5 itself also supports URLLC, the NG-RAN node 5 may broadcast the URLLC support indication parameter in one of the System information in order to indicate to the UEs that the URLLC is supported in that cell. The NG-RAN node 5 may broadcast the URLLC support indication parameter per slice basis or per DNN basis.

3) If the URLLC support indication parameter is present in the System Information broadcast, the UE 3 is aware that it can register for URLLC and also can trigger the URLLC PDU session establishment when needed.

Aspect 4—URLLC Supporting SMF Selection

Figure 8:
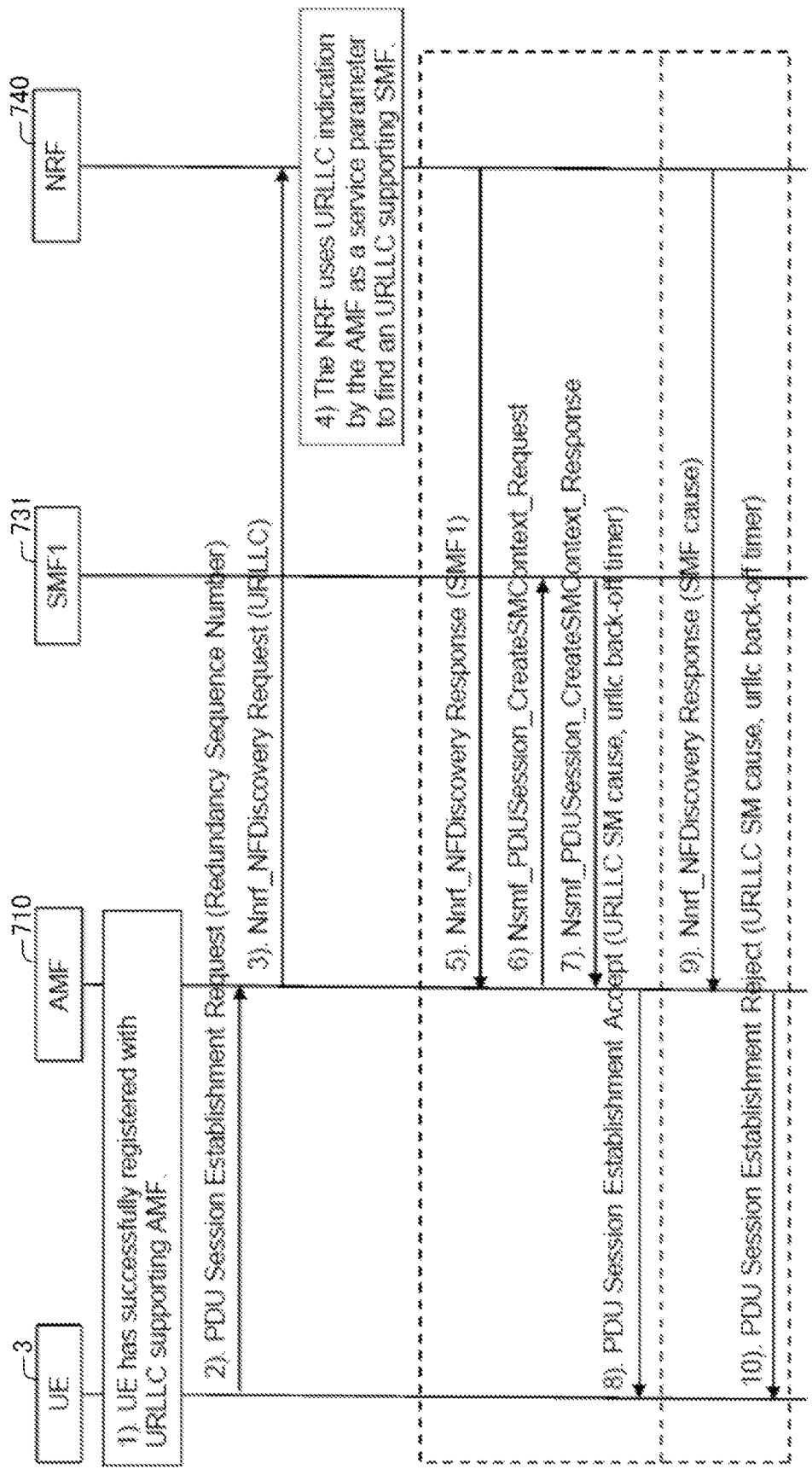
FIG. 8 illustrates an example of the URLLC supporting SMF selection.

The Aspect 4 proposes a method for the URLLC supporting SMF selection by the AMF 710. When a PDU session establishment request is initiated from the URLLC capable UE or the PDU session request includes the RSN (Redundancy Sequence Number), the AMF 710 needs to select an SMF 730 that supports URLLC. The AMF 710 performs the NRF discovery by including the URLLC parameter in the Nnrf Discovery Request. This way the AMF 710 selects a URLLC supporting SMF 730, see FIG. 8.

1) A URLLC capable UE has already registered with the URLLC supporting AMF 710.

2) A UE 3 initiate the PDU session establishment for URLLC (e.g., for the redundant user path with the Redundant Sequence Number).

3) The AMF 710 queries the appropriate NRF 740 in the serving PLMN by issuing the Nnrf_NFDiscovery_Request including an URLLC indication along with the other necessary parameter for the SMF selection.

4) The NRF 740 uses the URLLC indication by the AMF 710 as a service parameter to find an URLLC supporting SMF 730. If an URLLC supporting SMF 730 is available, the procedure continues with step 5 to step 8. If the URLLC supporting SMF 730 is not available, the procedure continues from step 9.

5) The NRF 740 in the serving PLMN provides to the AMF 710, e.g., FQDN(s) or IP address(s), of a set of the discovered SMF instance(s) (e.g., the SMF1 731) or Endpoint Address(es) of SMF service instance(s) that support URLLC in the Nnrf_NFDiscovery_Request response message. If the NRF 740 cannot find any SMFs that support the URLLC feature, then the NRF 740 replies to the AMF 710 with null or the error indication. In this case, the AMF 710 may restart from the step 3 without the URLLC indication included in the Nnrf_NFDiscovery_Request message in order to find a non URLLC supporting SMF 730, i.e., the normal SMF 730.

6) The AMF 710 invokes the Nsmf_PDUSession_CreateSMContext service operation.

7) If the SMF1 731 accepts the PDU session request, the SMF1 731 responds with the Nsmf_PDUSession_CreateSMContext Response message.

8) The AMF 710 responds with the PDU Session Establishment Accept message. The AMF 710 may include the URLLC SM cause parameter (or any other notation for a parameter with the purpose of indicating the status of the URLLC support) in the PDU Session Establishment Accept message. The URLLC SM cause parameter may indicate (i.e., it can take) the following values:

URLLC configured/supported—i.e., setting the URLLC PDU session is successful;

URLLC not configured/supported—i.e., URLLC PDU session establishment is not possible (e.g., there is no URLLC supporting SMF 730 available in the set of the SMFs that the AMF 710 can choose from). In this case the UE 3 shall not initiate another PDU session request for URLLC in the current registration area. This URLLC SM cause indication may be interpreted by the UE 3 as if the PDU session has been established without URLLC configuration; or URLLC not configured/supported in this location—the URLLC is not supported in the current location, e.g., cell, TA or registration area. In this case the UE 3 shall not initiate another PDU session request for URLLC PDU session establishment in this location area, e.g., cell or TA or registration area. This URLLC SM cause indication may be interpreted by the UE 3 as if the PDU session has been established without the URLLC configuration; and/or URLLC not configured/supported by the vPLMN—the URLLC is not supported by the visited PLMN. In this case the UE 3 shall not initiate another PDU session request for URLLC in this vPLMN. This URLLC SM cause indication may be interpreted by the UE 3 as if the PDU session has been established without the URLLC configuration; and/or URLLC overloaded—i.e., core network is overloaded (e.g., there is an URLLC supporting SMF 730 within the set of SMFs that the AMF 710 can choose from but that URLLC SMF is not available for overload reasons). In this case the AMF 710 may also return an URLLC back-off timer. If the URLLC back-off timer is included, the UE 3 shall not initiate another URLLC PDU Session establishment until the expiry of the URLLC back-off timer. This URLLC SM cause indication may be interpreted by the UE 3 as if the PDU session has been established without the URLLC configuration; and/or URLLC temporary unavailable—any technical failure or other reason that makes the URLLC unavailable. In this case the AMF 710 may also return an URLLC back-off timer. If URLLC back-off timer is included, the UE 3 shall not initiate another URLLC PDU Session establishment until the expiry of the URLLC back-off timer. This URLLC SM cause indication may be interpreted by the UE 3 as if the PDU session has been established without the URLLC configuration.

Lack of URLLC SM cause parameter can be interpreted by the UE 3 as if the PDU session has been established with the URLLC configuration.

Lack of URLLC SM cause parameter can be interpreted by the UE 3 as if the PDU session has been established without the URLLC configuration.

9) When the NRF 740 cannot find a URLLC supporting SMF 730, the NRF 740 responds to the AMF 710 with SMF_cause parameter in the Nnrf_NFDiscovery_Response (SMF_cause) message. The SMF cause may indicate the reason for SMF rejection, e.g.:

URLLC SMF not available/not supported—i.e., there is no URLLC supporting SMF 730 available in the set of SMFs that the AMF 710 can choose for;

URLLC supporting SMF overloaded—i.e., there is an URLLC supporting SMF 730 within the set of SMFs that the AMF 710 can choose from but that URLLC SMF is not available for overload reasons.

URLLC supporting SMF temporary unavailable—any technical or other reason that makes the URLLC SMF unavailable.

10) The AMF 710 rejects the PDU Session establishment by sending the PDU Session Establishment Reject message. The AMF 710 may include a URLLC SM cause in the PDU Session Establishment Reject message and, in some cases, a URLLC back-off timer to indicate, e.g.:

URLLC not configured/supported—i.e., the URLLC PDU session establishment is not possible (e.g., there is no URLLC supporting SMF 730 available in the set of SMFs that the AMF 710 can choose from). In this case the UE 3 shall not initiate another PDU session request for URLLC in the current registration area.

URLLC not configured/supported in this location—the URLLC is not supported in the current location, e.g., cell, TA or registration area. In this case the UE 3 shall not initiate another PDU session request for URLLC PDU session establishment in this location area, e.g., cell or TA or registration area.

URLLC not configured/supported by the vPLMN—the URLLC is not supported by the visited PLMN. In this case the UE 3 shall not initiate another PDU session request for URLLC in this vPLMN.

URLLC overloaded—i.e., core network is overloaded (e.g., there is an URLLC supporting SMF 730 within the set of SMFs that the AMF 710 can choose from but that URLLC SMF is not available for overload reasons). In this case the AMF 710 may also return an URLLC back-off timer. If URLLC back-off timer is included, the UE 3 shall not initiate another URLLC PDU Session establishment until the expiry of the URLLC back-off timer.

URLLC temporary unavailable—any technical failure or other reason that makes the URLLC unavailable. In this case the AMF 710 may also return an URLLC back-off timer. If the URLLC back-off timer is included, the UE 3 shall not initiate another URLLC PDU Session establishment until the expiry of the URLLC back-off timer.

Lack of URLLC SM cause indication can be interpreted by the UE 3 as if the PDU session has been established without the URLLC configuration.

Aspect 5—URLLC Support Via Designated Network Slice

The Aspect 5 proposes the URLLC support attribution to be a built-in network slice attribute.

An S-NSSAI is comprised of:

A Slice/Service type (SST), which refers to the expected Network Slice behaviour in terms of features and services;

A Slice Differentiator (SD), which is optional information that complements the Slice/Service type(s) to differentiate amongst multiple Network Slices of the same Slice/Service type Example 1: Proposes a new Slice Service Type (SST) value for URLLC support with redundant user plane path—URLLC redundant path or any other notation for SST for the purpose of establishing PDU session with user plane redundancy, see Table 1.

Although Table 1 shows that value '4' is used for URLLC support with the redundant user plane path, the SST value may take any other value for the same purpose of URLLC support with the redundant user plane path indication. When the AMF 710 provides the Allowed NSSAI (a list of allowed S-NSSAIs) to the UE 3, the AMF 710 may include an S-NSSAI designated for the URLLC redundant path although the URLLC feature cannot be supported by the NG-RAN node 5 or 5GC. In this case, the AMF 710 may indicate to the UE 3 that the redundant user path cannot be configured. When the AMF 710 provides the Allowed NSSAI (the list of allowed S-NSSAIs) to the UE 3, the AMF 710 may not include an S-NSSAI designated for the URLLC redundant user path if the URLLC feature cannot be supported by the NG-RAN node 5 or 5GC. In this case, the AMF 710 may indicate the UE 3 that the non redundant path can still be configurable for that 5-NSSAI.

TABLE 1

New standardised SST value of URLLC redundant path

| Slice/Service type | SST value | Characteristics. |
|---|---|---|
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |

TABLE 1-continued

New standardised SST value of URLLC redundant path

| Slice/Service type | SST value | Characteristics. |
|---|---|---|
| URLLC redundant path | 4 | URLLC with redundant user plane path |

Example 2: Proposes new Slice Differentiator (SD) for URLLC. The new SD includes information whether the network slice support redundant user path establishment.

When the AMF 710 provides the Allowed NSSAI (a list of allowed S-NSSAIs) to the UE 3, the AMF 710 may include an S-NSSAI designated for the URLLC redundant path although the URLLC feature cannot be supported by the NG-RAN node 5 or 5GC. In this case, the AMF 710 may indicate to the UE 3 that the redundant user path cannot be configured.

When the AMF 710 provides the Allowed NSSAI (the list of allowed S-NSSAIs) to the UE 3, the AMF 710 may not include an S-NSSAI designated for the URLLC redundant user path if the URLLC feature cannot be supported by the NG-RAN node 5 or 5GC. In this case, the AMF 710 may indicate the UE 3 that the non redundant path can still be configurable for that S-NSSAI.

Beneficially, the above described aspects include, although they are not limited to, one or more of the following functionalities:
1. URLLC Support negotiation among network nodes and URLLC support indication by the network within the Registration procedure or via the System Information broadcast so that a URLLC capable UE is aware of whether it can trigger URLLC type PDU Session establishment and avoid PDU Session establishment for URLLC failure in case the URLLC is not supported by the network.
2. URLLC supporting SMF selection by the AMF 710 by adding a new URLLC parameter in the NRF enquiry procedure and return of URLLC SM cause and URLLC back-off timer to the UE 3 in case of URLLC PDU session establishment failure.

The above functionalities may be implemented using one or more of the following exemplary features:
1) UE capability for URLLC indication in the RRC message
2) UE capability for URLLC indication in the Registration Request message
3) Network support for URLLC indication in the Registration Accept and UE Configuration Update messages.
4) Network support for URLLC indication in the System Information broadcast.
5) AMF 710 support for URLLC indication in the N2 Setup Response message, AMF 710 Configuration Update message and in RAN Configuration Update Acknowledge message.
6) URLLC SM cause and URLLC back-off timer from the NRF 740 and AMF 710 for the UE
7) URLLC support as a UE subscription information.
8) URLLC supporting SST and SD values for the Network Slice.

The above aspects describe exemplary methods comprising (at least some of) the following steps.
Aspect 1:
1) UE capability for URLLC indication in the RRC message 2) UE capability for URLLC indication in the Registration Request message
3) URLLC support as a UE subscription information.
4) AMF 710 support for URLLC indication in the N2 Setup Response message,
5) Network support for URLLC indication in the Registration Accept and UE Configuration Update messages.

Aspect 2:
URLLC support information exchange between the AMF 710 and NG-RAN node 5

Aspect 3:
URLLC support by the network broadcast in the System Information.

Aspect 4:
URLLC supporting SMF selection by the AMF 710 via NRF enquiry.

Aspect 5:
URLLC supporting SST and SD values for the Network Slice.

Benefits

The disclosure proposes URLLC support indication by the network during the registration procedure so that a URLLC capable UE can avoid URLLC PDU session establishment failures when the network does not support URLLC.

System Overview

Figure 9:
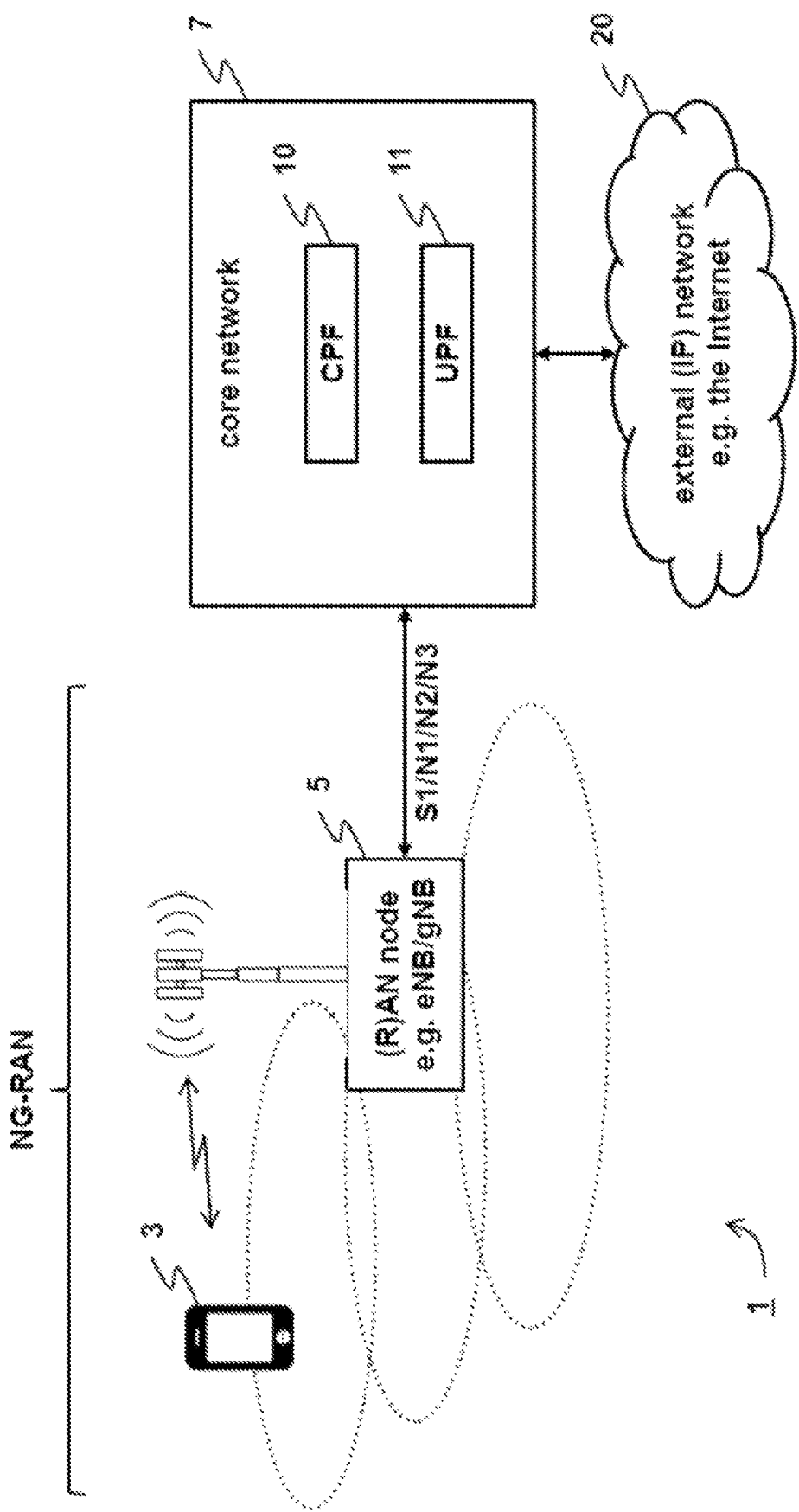
FIG. 9 schematically illustrates a mobile telecommunication system.

FIG. 9 schematically illustrates a mobile (cellular or wireless) telecommunication system 1 to which the above aspects and examples are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 9 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNB'. In this example, the base station 5 forms part of a 'Next Generation' RAN (NG-RAN) which supports 5G communications. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. Such control plane functions (and user plane functions) may provide the functionality of the AMF 710, the UDM/UDR 720, the SMF 730, and/or the NRF 740 discussed in the above aspects.

From the core network 7, connection to an external IP network 20 (such as the Internet) is also provided.

The components of this system 1 are configured to perform the above described aspects.

User Equipment (UE)

Figure 10:
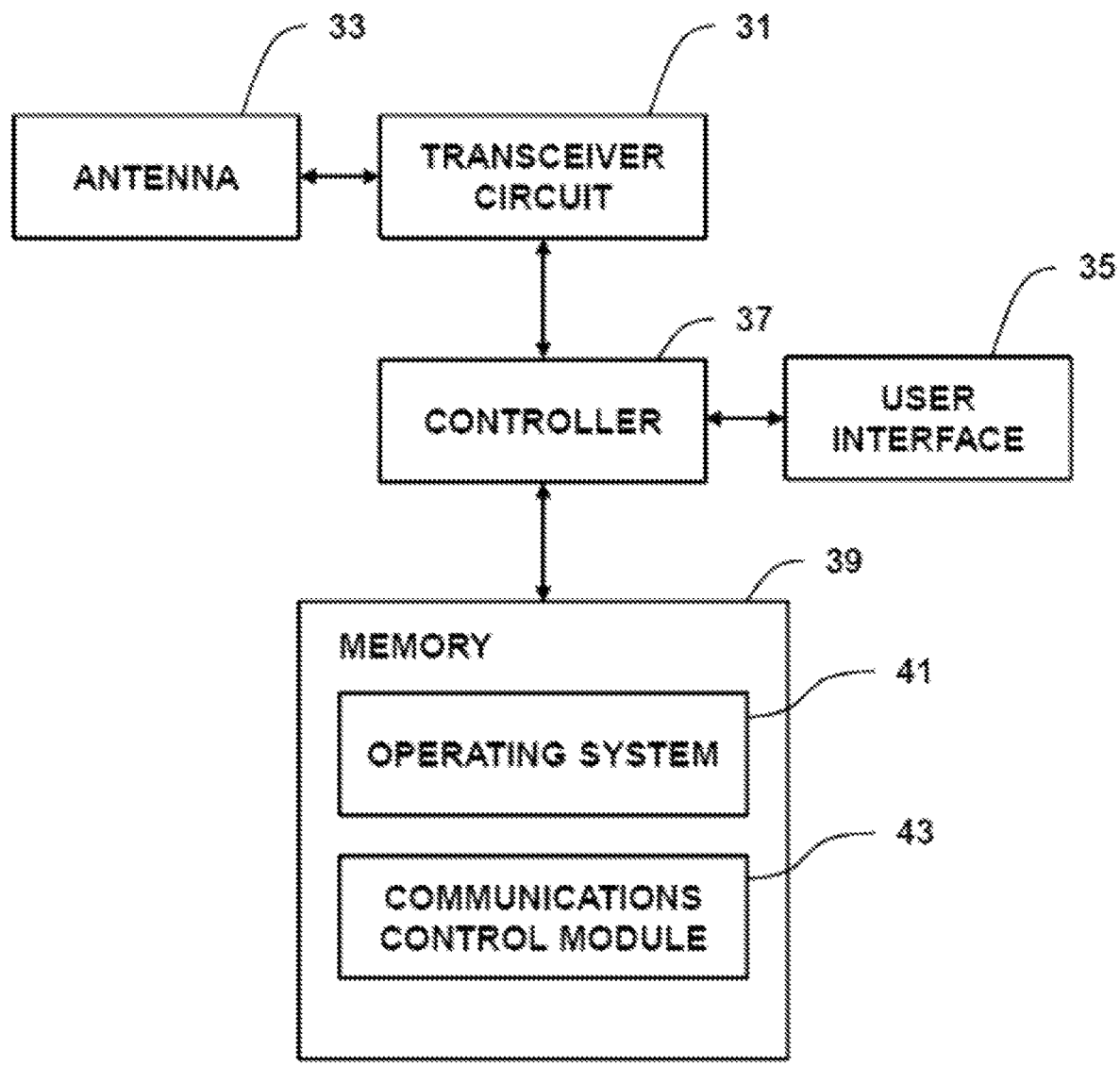
FIG. 10 is a block diagram illustrating the main components of the UE.

FIG. 10 is a block diagram illustrating, in more detail, the main components of the UE (mobile device 3) shown in FIG. 9. As shown, the UE 3 includes a transceiver circuit 31 which is operable to transmit signals to and to receive signals from the connected node(s) via one or more antenna 33. Although not necessarily shown, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages, including uplink/downlink data packets, between the UE 3 and other nodes (e.g., (R)AN nodes 5 and core network nodes), in accordance with any one of the above described aspects.

(R)AN Node

Figure 11:
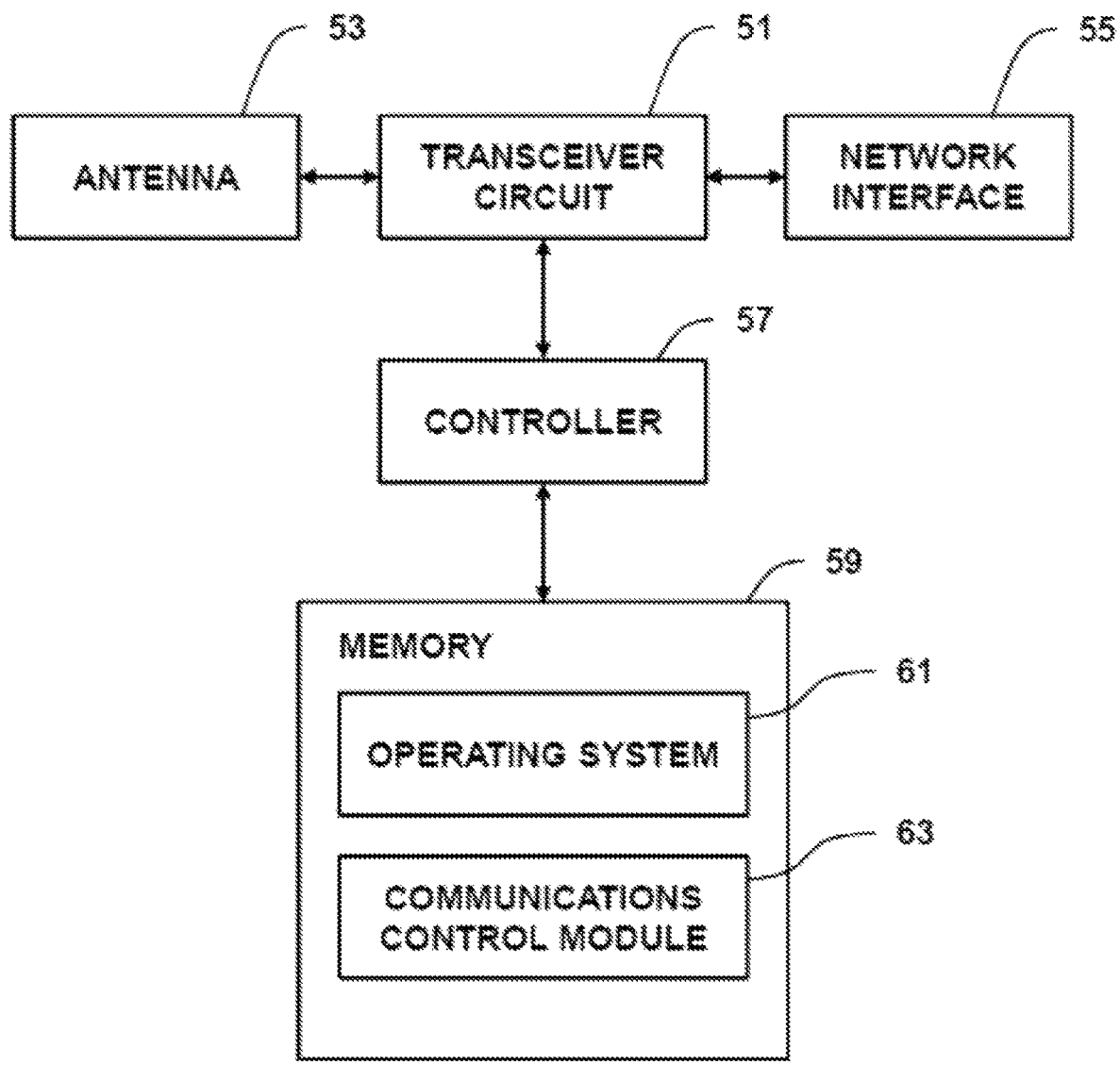
FIG. 11 is a block diagram illustrating the main components of an exemplary (R)AN node 5.

FIG. 11 is a block diagram illustrating, in more detail, the main components of an exemplary (R)AN node 5 (base station) shown in FIG. 9. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signaling between the (R)AN node 5 and other nodes, such as the UE 3 and the core network nodes/network elements. Such signaling includes appropriately formatted messages (and information elements thereof) in accordance with any one of the above described aspects.

Core Network Node

Figure 12:
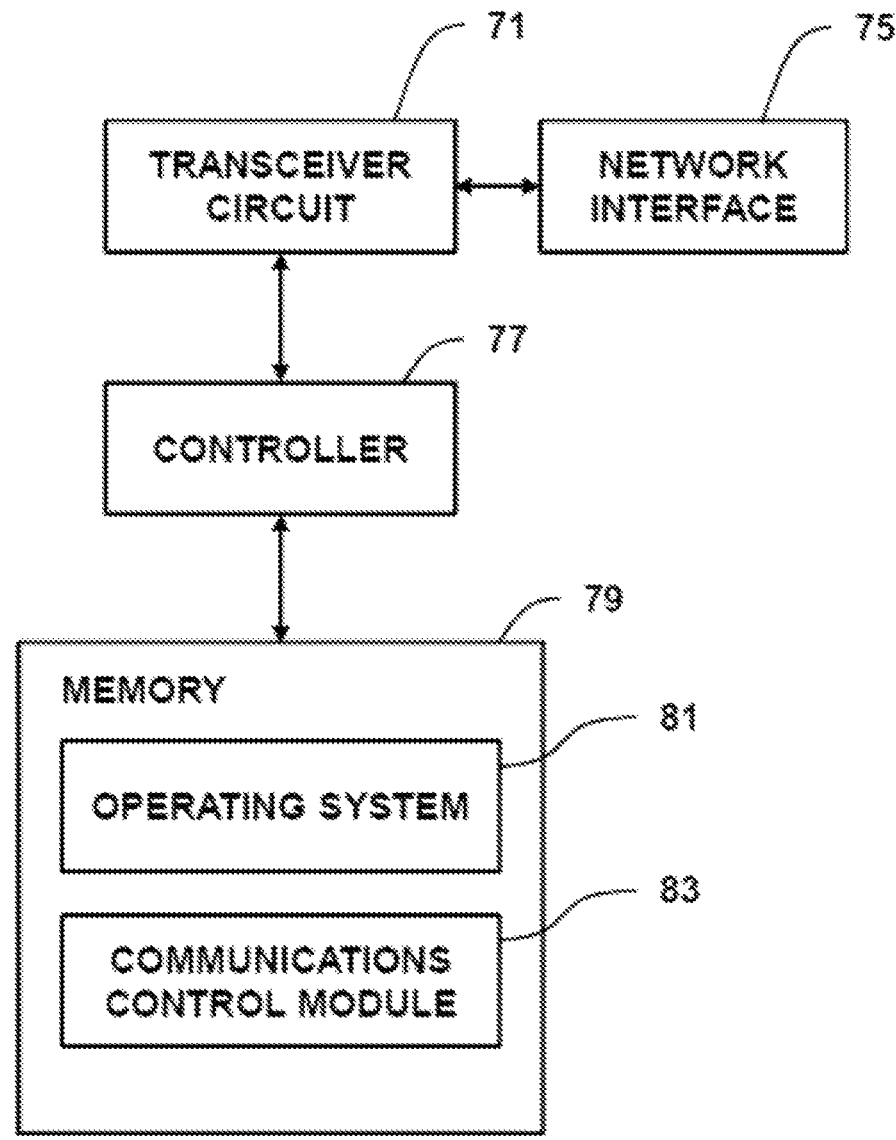
FIG. 12 is a block diagram illustrating the main components of a generic core network node.

FIG. 12 is a block diagram illustrating, in more detail, the main components of a generic core network node (network element or function) shown in FIG. 9. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted messages (and information elements thereof) in accordance with any one of the above described aspects.

Modifications and Alternatives

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g., control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above aspects are also applicable to 'non-mobile' or generally stationary user equipment.

Various other modifications will be apparent to those skilled in the art and will not be described in further detail here.

CITATION LIST

Non Patent Literature

[NPL 1] 3GPP TR 21.905: "Vocabulary for 3GPP Specifications", V15.0.0 (2018-03)
[NPL 2] 3GPP TS 23.501: "System Architecture for the 5G System; Stage 2", V15.3.0 (2018-9)—http://www.3gpp.org/ftp/Specs/archive/23_series/23.501/23501-f30.zip

[NPL 3] 3GPP TS 23.502: "Procedures for the 5G System; Stage 2", V15.3.0 (2018-9)—http://www.3gpp.org/ftp/Specs/archive/23_series/23.502/23502-f30.zip
[NPL 4] 3GPP TS 38.413 "NG Application Protocol (NGAP)", V15.1.0 http://www.3gpp.org/ftp/Specs/archive/38_series/38.413/38413-f10.zip
[NPL 5] 3GPP TS 38.331 "Radio Resource Control (RRC); Protocol specification", V15.3.0 http://www.3gpp.org/ftp/Specs/archive/38_series/38.331/38331-f30.zip
[NPL 6] 3GPP TR 23.725 "Study on enhancement of Ultra-Reliable Low-Latency Communication (URLLC) support in the 5G Core network (5GC", V2.0.0 http://www.3gpp.org/ftp/Specs/archive/23_series/23.725/23725-200.zip
[NPL 7] S2-1811754 http://www.3gpp.org/ftp/tsg_sa/WG2Arch/TSGS2_129BIS_WestPalm_Beach/Docs/S2-1811754.zip
[NPL 8] IEEE 802.1CB-2017: IEEE Standard for Local and metropolitan area networks—Frame Replication and Elimination for Reliability, https://ieeexplore.ieee.org/document/8091139/
[NPL 9] IEEE 802.1Q: "IEEE Standard for Local and metropolitan area networks—Bridges and Bridged Networks".

Abbreviations

5GC 5G Core Network
5GS 5G System
5G-AN 5G Access Network
AMF Access and Mobility Management Function
AN Access Network
AS Access Stratum
DC Dual Connectivity
DN Data Network
DNN Data Network Name
FQDN Fully Qualified Domain Name
FRER Frame Replication and Elimination for Reliability
GCF Global Certification Forum
MNG-RAN Master Next Generation Radio Access Network
NAS Non-Access Stratum
NEF Network Exposure Function
NF Network Function
NG-RAN Next Generation Radio Access Network
NR New Radio
NRF Network Repository Function
PDU Protocol Data Unit
PLMN Public land mobile network
QoS Quality of Service
(R)AN (Radio) Access Network
RRC Radio Resource Control
SD Slice Differentiator
SNG-RAN Slave Next Generation Radio Access Network
SMF Session Management Function
S-NSSAI Single Network Slice Selection Assistance Information
SST Slice/Service Type
TSN Time Sensitive Networking
UDR Unified Data Repository
UPF User Plane Function
URLLC Ultra Reliable Low Latency Communication
VPLMN Visited Public land mobile network Definitions For the purposes of the present document, the terms and definitions given in 3GPP TR 21.905 [1] and the following apply. A term defined in the present document takes precedence over the definition of the same term, if any, in 3GPP TR 21.905 [1].

Although the present disclosure has been described above with reference to some aspects, the present disclosure is not limited to the aspects. The configurations and details of the present disclosure can be changed in various manners that can be understood by one skilled in the art within the scope of the present disclosure.

This application is based upon and claims the benefit of priority from European patent application No. 19150842.3, filed on Jan. 8, 2019, the disclosure of which is incorporated herein in its entirely by reference.

REFERENCE SIGNS LIST 1 telecommunication system
3 UE
31 transceiver circuit
33 antenna
35 user interface
37 controller
39 memory
41 operating system
43 communications control module
5 NG-RAN node
51 transceiver circuit
53 antenna
55 network interface
57 controller
59 memory
61 operating system
63 communications control module
501 NG-RAN node1
502 NG-RAN node2
7 core network
71 transceiver circuit
75 network interface
77 controller
79 memory
81 operating system
83 communications control module
710 AMF
720 UDM/UDR
730 SMF
731 SMF1
732 SMF2
740 NRF
750 UPF
751 UPF1
752 UPF2
10 CPF
11 UPF
20 external IP network

What is claimed is:
1. A core network node comprising:
a memory storing instructions; and
at least one processor configured to process the instructions to:
receive a request for establishment of a Protocol Data Unit (PDU) session initiated from a User Equipment (UE) for redundant handling of Ultra Reliable and Low Latency Communication (URLLC), and
reject the establishment of the PDU session in response to the core network node determining that the redundant handling is not allowed for the PDU session using subscription information from a Unified Data Management (UDM) node.

2. The core network node according to claim 1, wherein the redundant handling uses Dual Connectivity.

3. A method for a core network node, the method comprising:
  receiving a request for establishment of a Protocol Data Unit (PDU) session initiated from a User Equipment (UE) for redundant handling of Ultra Reliable and Low Latency Communication (URLLC), and
  rejecting the establishment of the PDU session in response to the core network node determining that the redundant handling is not allowed for the PDU session using subscription information from a Unified Data Management (UDM).

4. The method according to claim 3, wherein the redundant handling uses Dual Connectivity.

5. A User Equipment (UE), comprising:
  a memory storing instructions; and at least one processor configured to process the instructions to:
  initiate establishment of a Protocol Data Unit (PDU) session for redundant handling of Ultra Reliable and Low Latency Communication (URLLC),
  wherein the establishment of the PDU session is rejected by a core network node in response to the core network node determining that the redundant handling is not allowed for the PDU session using subscription information from a Unified Data Management (UDM) node.

6. A method of a User Equipment (UE), the method comprising:
  initiating establishment of a Protocol Data Unit (PDU) session for redundant handling of Ultra Reliable and Low Latency Communication (URLLC),
  wherein the establishment of the PDU session is rejected by a core network node in response to the core network node determining that the redundant handling is not allowed for the PDU session using subscription information from a Unified Data Management (UDM) node.

* * * * *